United States Patent
Namazue et al.

(10) Patent No.: US 7,425,009 B2
(45) Date of Patent: Sep. 16, 2008

(54) FRONT FORK APPARATUS IN TWO-WHEELED VEHICLE OR THE LIKE

(75) Inventors: Eitaro Namazue, Shizuoka (JP); Yousuke Hasumi, Shizuoka (JP)

(73) Assignee: Showa Corporation, Saitama (JP)

( * ) Notice: Subject to any disclaimer, the term of this patent is extended or adjusted under 35 U.S.C. 154(b) by 362 days.

(21) Appl. No.: 11/156,926

(22) Filed: Jun. 20, 2005

(65) Prior Publication Data

US 2006/0138744 A1    Jun. 29, 2006

(30) Foreign Application Priority Data

Dec. 27, 2004    (JP) .............................. 2004-377756

(51) Int. Cl.
*B62K 21/02* (2006.01)
*B62K 19/30* (2006.01)

(52) U.S. Cl. .................. 280/279; 280/276; 280/277; 180/219; 267/64.26

(58) Field of Classification Search ............... 280/279, 280/276, 277; 180/219; 267/64.26
See application file for complete search history.

(56) References Cited

U.S. PATENT DOCUMENTS

| | | | | |
|---|---|---|---|---|
| 4,878,558 A | * | 11/1989 | Asakura ..................... | 180/219 |
| 5,908,200 A | * | 6/1999 | Stewart ..................... | 280/276 |
| 6,164,675 A | * | 12/2000 | Pickering ..................... | 280/277 |
| 6,260,870 B1 | * | 7/2001 | Fan ............................ | 280/276 |
| 6,412,803 B1 | * | 7/2002 | Lalikyan et al. ............. | 280/276 |
| 6,457,732 B2 | * | 10/2002 | Ito et al. ..................... | 280/277 |
| 6,837,508 B2 | * | 1/2005 | Francis et al. ............... | 280/276 |
| 6,918,605 B2 | * | 7/2005 | Wada et al. .................. | 280/279 |

FOREIGN PATENT DOCUMENTS

JP        2004-224137        8/2004

\* cited by examiner

*Primary Examiner*—Lesley D. Morris
*Assistant Examiner*—Marlon A Arce Diaz
(74) *Attorney, Agent, or Firm*—Orum & Roth LLC

(57) ABSTRACT

In a front fork apparatus of a two-wheeled vehicle or the like in which left and right front fork constituted by vehicle body side tubes and tire wheel side tubes which are slidably fitted to each other, are provided in both left and right sides of a front wheel, and a brake apparatus is attached only to the front fork in one side of the left and right sides, a thickness of the tire wheel side tube of the front fork in the one side to which the brake apparatus is attached, is made larger than a thickness of the tire wheel side tube of the front fork in the other side.

6 Claims, 3 Drawing Sheets

FRONT FORK APPARATUS IN TWO-WHEELED VEHICLE OR THE LIKE

BACKGROUND OF THE INVENTION

1. Field of the Invention

The present invention relates to a front fork apparatus in a two-wheeled vehicle or the like.

2. Description of the Related Art

In a front fork apparatus in a two-wheeled vehicle or the like, there is a single disc type structure in which a disc plate is attached only to a front fork on one side of the right or left side of a front wheel. In the front fork apparatus mentioned above, a rider feels a yaw feeling that the front fork is shifted to one side of the right or the left during braking. Under these conditions, the handlebars for steering may be shifted to one side.

In Japanese Patent Application Laid-open No. 2004-224137 (patent document 1), there is disclosed an inverted type front fork apparatus in a two-wheeled motor vehicle or the like in which a suspension spring is provided only in a front fork in one side, for example, the left side of right and left front forks. A thickness of an inner tube of the front fork in the other side, for example the right side provided with no suspension spring is larger than a thickness of an inner tube of the front fork in the one side, for example the left side provided with the suspension spring.

In the front fork apparatus mentioned above, in the case that the front fork apparatus is compressed during braking, the front fork apparatus generates a rotation moment around a ground point of the front wheel toward the right front fork provided with no suspension spring, on the basis of a reaction force of the suspension spring.

On the other hand, when braking, the right and left front forks, particularly, a lower end portion of a tire wheel side tube is deflected to a rear side in a forward moving direction on the basis of a friction force between the front wheel and a road surface. Since a deflecting amount of the right front fork in which the thickness of the inner tube is made large is smaller than that of the left front fork having the small thickness, the front fork apparatus generates a rotation moment toward the side of the left front fork having the small thickness (the side provided with the suspension spring) around the ground point of the front wheel.

As a result, the yaw feeling of the front wheel at a time of braking is reduced by canceling two moments generated at a time of braking. A moment in a rightward direction is generated with no suspension spring depending on the presence or absence of the suspension spring, and a moment in a leftward direction depending on having the small thickness based on a difference of the thickness.

However, in the single disc type front fork apparatus in which the brake apparatus is provided on only one side of the front wheel, the yaw feeling is generated even in the front fork apparatus in which the suspension spring is provided in the front forks on both the right and left sides, or in which the suspension spring is provided only in the front fork on one side.

SUMMARY OF THE INVENTION

An object of the present invention is to provide a front fork apparatus which can reduce a yaw feeling during braking in a single disc type front fork apparatus of a two-wheeled vehicle or the like.

The present invention relates to a front fork apparatus of a two-wheeled vehicle or the like. A front fork is constituted by a vehicle body side tube and a tire wheel side tube which are slidably fitted to each other. The front fork is provided in both right and left sides of a front wheel. A brake apparatus is attached only to the front fork on one side of the right and left sides. A thickness of the tire wheel side tube of the front fork on the one side to which the brake apparatus is attached, is made larger than a thickness of the tire wheel side tube of the front fork on the other side.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
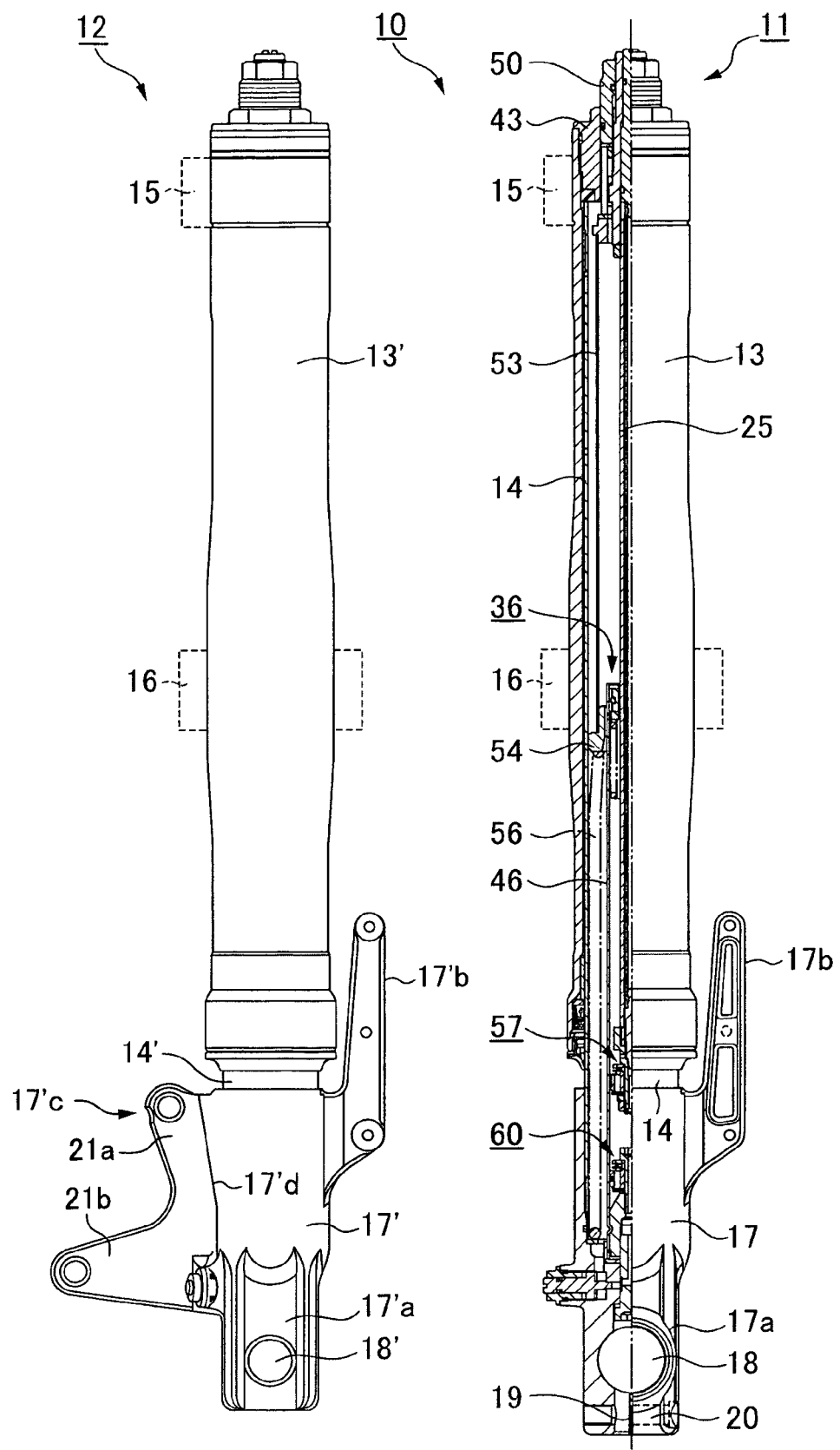
FIG. 1 shows an entire of a front fork apparatus, in which a right front fork is shown by a side elevational view and a left front fork is shown by a half cross sectional view.

As shown in FIG. 1, the front fork apparatus 10 is constituted by a left front fork 11 and a right front fork 12 as seen from a rider. The left and right front forks 11 and 12 have outer tubes 13 and 13' and inner tubes 14 and 14'.

Figure 3:
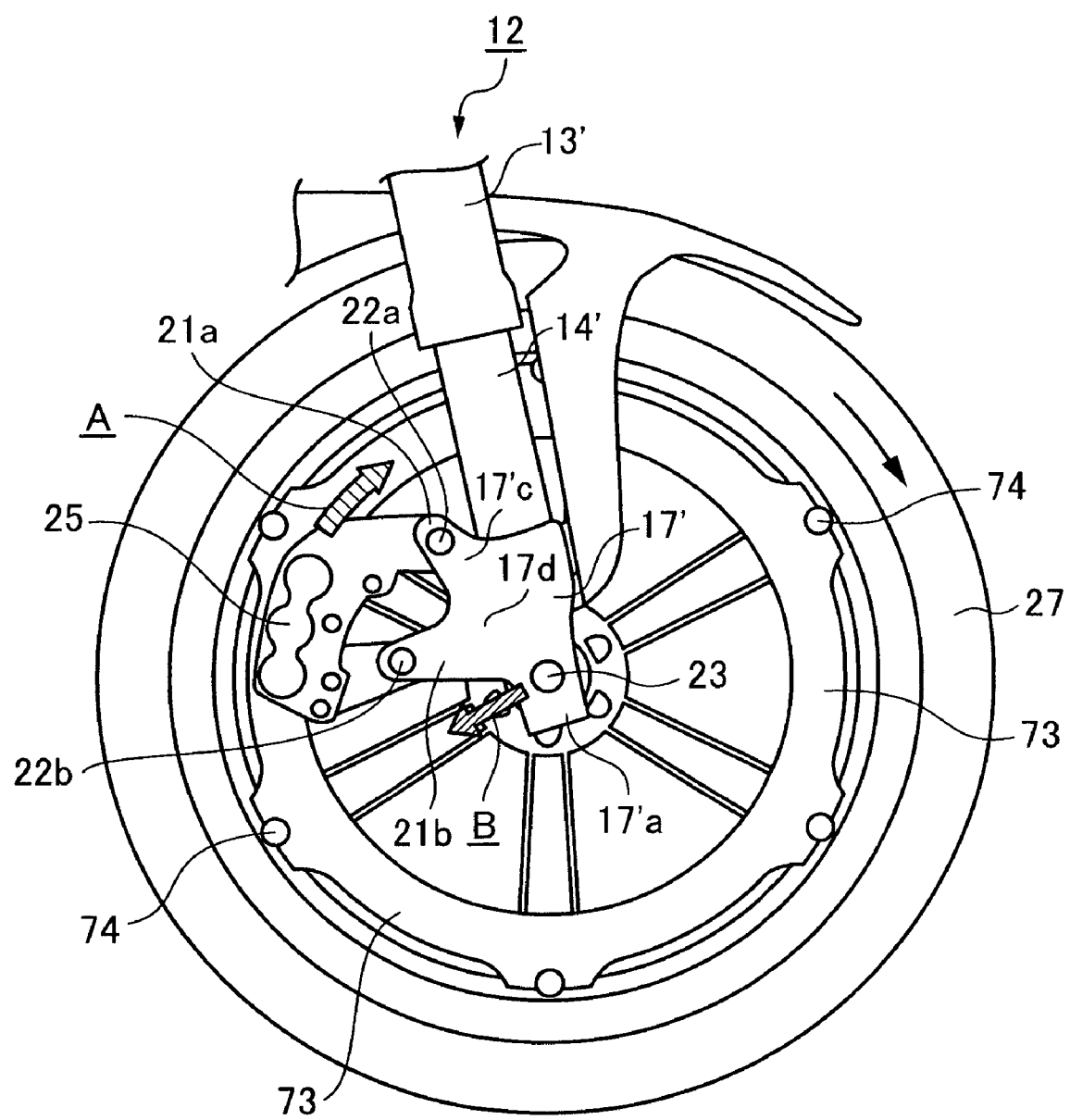
FIG. 3 is a schematic view showing a right portion of a front wheel of a two-wheeled motor vehicle to which the present front fork apparatus is attached.

The left and right outer tubes 13 and 13' are coupled to a steering shaft (not shown) in a vehicle body side via an upper bracket 15 and an under bracket 16. The steering shaft is provided within a head pipe (not shown) in a leading end of a vehicle body frame so as to freely oscillate right and left. Axle brackets 17 and 17' are respectively fixed by screwing to lower end portions of the left and right inner tubes 14 and 14'. Axle portions 17a and 17'a provided with axle holes 18 and 18' inserting an axle 23 shown in FIG. 3 thereto are respectively formed in the left and right axle brackets 17 and 17'. A slot 19 in an axial direction is formed in the axle hole 18 of the left front fork 11, however, the slot 19 is not formed in the right axle hole 18'. The axle 23 is inserted to the axle holes 18 and 18', and the axle 23 is fixed by fastening a bolt (not shown) to a fastening hole 20 of the axle portion 17a of the left front fork 11. A front wheel 27 shown in FIG. 3 is rotatably provided in the axle 23.

Stays 17b and 17'b for attaching fenders are integrally formed in front portions of the left and right axle brackets 17 and 17', respectively. A brake bracket portion 17'c attaching a brake caliper 25 or other brake apparatus shown in FIG. 3 is integrally formed in a rear portion of the axle bracket 17' in the right front fork 12. However, the brake bracket portion 17'c is not formed in the axle bracket 17 of the left front fork 11.

As mentioned above, the left and right front forks 11 and 12 have the same structure except that the right front fork 12 forms the brake bracket portion 17'c attaching the brake caliper 25, and that shapes of the axle portions 17a and 17'a are different.

Next, a description will be given of a structure of an inner portion of each of the left and right front forks 11 and 12. Since the structures of the inner portions of the left and right front forks 11 and 12 are the same, a description will be given only of the left front fork 11.

Figure 2:
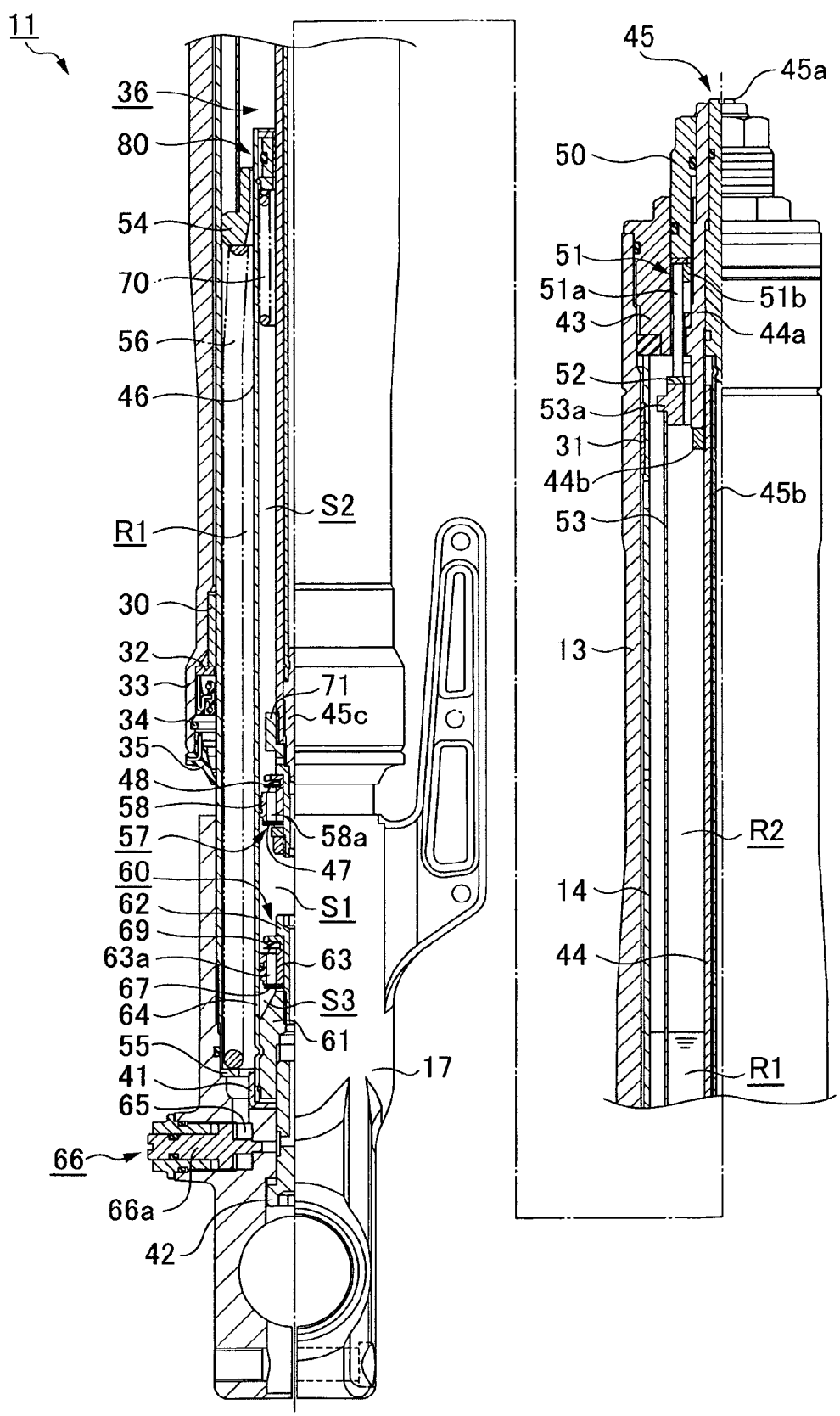
FIG. 2 is a half cross sectional view showing the left front fork in FIG. 1 in an enlarged manner.

As shown in FIG. 2, the outer tube 13 in the vehicle body side and the inner tube 14 in the tire wheel side slide via a bush 30 fitted and attached to an inner periphery of a lower end portion of the outer tube 13 and a slide bush 31 fitted and attached to an outer periphery of an upper end portion of the inner tube 14. An inner periphery of a leading end portion of the outer tube 13 is expanded, and an annular washer 32, an oil seal 33, a stopper ring 34 and a dust seal 35 are alphabetically provided in the expanded inner periphery in the leading end portion.

The axle bracket 17 is fixed by screwing to an outer periphery of a lower end portion of the inner tube 14. A lower end portion of a damper cylinder 46 of a damper 36 is fixed to a bottom portion of the axle bracket 17 by a bottom bolt 42 while holding a bottom portion of a cup-like portion 41 therebetween.

A closed-end cap 43 is screwed with an upper end portion of the outer tube 13. A tubular housing 44a is screwed to an upper end portion of a hollow piston rod 44 and is fixed by a lock nut 44b. The tubular housing 44a is fixed by screwing to a bottom portion of the cap 43.

The piston rod 44 is inserted to an inner portion of the damper cylinder 46 by being guided in a slidable contact manner to an inner periphery of a rod guide assembly 80 provided in an upper end opening portion of the damper cylinder 46. A piston valve apparatus 57 (an expansion side damping force generating apparatus) is provided in a lower end portion of the piston rod 44. The piston valve apparatus 57 sections an inner portion of the damper cylinder 46 into a piston side oil chamber S1 and a rod side oil chamber S2 by a piston 58 fixed to a leading end portion of the piston rod 44. The piston 58 is provided with an expansion side flow path 58a and a compression side flow path (not shown) allowing communication between the piston side oil chamber S1 and the rod side oil chamber S2. An expansion side disc valve 47 is provided in the expansion side flow path 58a, and a compression side check valve 48 is provided in the compression side flow path.

A damping force regulating apparatus 45 is provided within the hollow piston rod 44. The damping force regulating apparatus 45 is constituted by a damping force regulating adjuster 45a rotatably provided within the tubular housing 44a, a hollow rod 45b fixed to a lower end portion of the damping force regulating adjuster 45a, and a needle valve 45c fixed to a leading end portion of the hollow rod 45b.

A spring load regulating adjuster 50 is attached by screwing to an outer periphery of the tubular housing 44a. A pressing pin assembly 51 is provided in a lower end surface of the spring load regulating adjuster 50. The pressing pin assembly 51 has three pressing pins 51a inserted to a bottom portion of the closed-end cap 43, and an annular body 51b in which upper end portions of three pressing pins 51a are integrally molded. A joint collar 53a fitted and attached to an upper end portion of a spring collar 53 is provided in a lower portion of the pressing pin assembly 51 via a spacer 52.

A tubular oil lock collar 54 doubling as an upper spring receiver is fitted and attached to a lower end portion of the spring collar 53. A lower spring receiver 55 is provided in an inner periphery of a lower end portion of the axle bracket 17. A suspension spring 56 is interposed between the lower spring receiver 55 and a lower end portion of the oil lock collar 54. The pressing pin assembly 51 vertically moves forward and backward under the influence of a rotating operation of the spring load regulating adjuster 50, and the spring collar 53 and the oil lock collar 54 next move upward and downward, whereby an initial load of the suspension spring 56 is regulated.

An oil reservoir chamber R1 and a gas chamber R2 are provided in an outer peripheral portion of the damper cylinder 46, in the inner portions of the outer tube 13 and the inner tube 14. A working fluid in the oil reservoir chamber RI contributes to lubrication of the bush 30, the slide bush 31 and the oil seal 33. The suspension spring 56 and a gas spring in the gas chamber R2 absorb impact forces received from a road surface.

A base valve apparatus (a compression side damping force generating apparatus) 60 is provided in a bottom portion of the damper cylinder 46. The base valve apparatus 60 has a bottom holder 61 fixing the damper cylinder 46 to the bottom portion of the axle bracket 17 by the bottom bolt 42 in the manner mentioned above. A bolt 62 is screwed with a leading end portion of the bottom holder 61, and a bottom piston 63 is fixed to an outer periphery of the bolt 62. The bottom piston 63 sections and forms a bottom valve chamber S3 in a lower side of the piston side oil chamber S1. The bottom piston 63 is provided with a compression side flow path 63a and an expansion side flow path (not shown) which allow communication between the piston side oil chamber S1 and the bottom valve chamber S3. A compression side disc valve 67 is provided in the compression side flow path 63a, and an expansion side check valve 69 is provided in the expansion side flow path. The bottom valve chamber S3 communicates with the oil reservoir chamber R1 by an oil hole 64 provided in the damper cylinder 46.

A bypass path 65 communicating the piston side oil chamber S1 and the oil reservoir chamber R1 is provided in the bolt 62 of the base valve apparatus 60, the bottom holder 61, the bottom bolt 42 and the bottom portion of the axle bracket 17. A damping force regulating apparatus 66 provided with a needle valve 66a for regulating a flow path area of the bypass path 65 is provided in a rear portion of a lower end portion of the axle bracket 17.

The damper 36 damps a stretching vibration of the outer tube 13 and the inner tube 14 caused by the absorption of the impact force by the suspension spring 56 and the gas spring, through a damping force generated by the piston valve apparatus 57 and the base valve apparatus 60.

Accordingly, the front fork 11 carries out a damping operation in the manner mentioned below.

(Compression Period)

In the compression period of the front fork 11, in the base valve apparatus 60, a compression side damping force is generated by oil flowing through the compression side disc valve 67 of the compression side flow path 63a or the needle valve 66a. Damping force is generated at a low relative level in the piston valve apparatus 57.

(Expansion Period)

In the expansion period of the front fork 11, in the piston valve apparatus 57, an expansion side damping force is generated by oil flowing through the expansion side disc valve 47 of the expansion side flow path 58a or the needle valve 45c. Damping force is generated at a low relative level in the base valve apparatus 60.

In this case, in the maximum compression period of the front fork 11, in the outer side of the damper cylinder 46, the oil lock collar 54 fitted and attached to the lower end portion of the spring collar 53 is fitted to the outer periphery of the upper end portion of the damper cylinder 46 via a small gap. Oil is sealed in the lower end portion of the oil lock collar 54, thereby carrying out the buffering in the maximum compression period.

In the maximum expansion period of the front fork 11, buffering is carried out by bringing a rebound spring 70 arranged in the inner peripheral portion of the upper end of the damper cylinder 46 into contact with a spring stopper 71 on a side of the piston 58 provided in the leading end portion of the piston rod 44.

Next, as shown in FIGS. 1 and 3, the brake bracket portion 17′c is integrally formed at a position which is eccentric to an upper side from the axle portion 17′a inserting the axle 23 thereto, in a rear portion of the axle bracket 17′ of the right front fork 12. The brake bracket portion 17′c is provided with upper and lower arms 21a and 21b, and the brake caliper (the brake apparatus) 25 is fixed to leading end portions of the upper and lower arms 21a and 21b respectively by bolts 22a and 22b.

A disc plate 73 is supported in a floating manner only to the right side of the front wheel 27 by six bolts 74 fixed to a rim of the front wheel 27. The brake caliper (the brake apparatus) 25 is positioned in an inner peripheral side in a radial direction of the disc plate 73, and is provided with a brake pad (not shown) in both sides of the disc brake 73 astride an inner peripheral portion of the disc plate 73. Further, the brake caliper 25 is provided with a piston (not shown) pressing the brake pad. The piston presses the brake pad during brake operation so as to bring the brake pad into slidable contact with the disc plate 73.

In this case, during conditions which give rise to the present problem, a strain gauge may be attached to a position directly above the axle brackets 17 and 17′ in the front side of the inner tubes of the left and right front forks 11 and 12, in a position directly above the front side of the under bracket 16 of the outer tubes 13 and 13′ respectively, in an axial direction and a diametrical direction, thereby carrying out a stress measurement.

As a result, the strain gauge attached to the position directly above the axle brackets 17 and 17′ in the front side of the inner tubes 14 and 14′ in the axial direction generates a great stress difference, and it is confirmed that the right front fork 12 to which the disc plate 73 is attached generates approximately ten times the stress difference in the inner tubes 14 and 14′ and approximately five times the stress difference in the outer tubes 13 and 13′ to the maximum in comparison with the left front fork 11 to which the disc plate 73 is not attached. A temporal phase difference is not generated in the left and right front forks 11 and 12, however, the difference mentioned above is generated in the strain amount. Accordingly, it is considered that the riser feels the difference of the deflection amount in the longitudinal direction of the left and right front forks 11 and 12, and this is a main reason of the yaw feeling.

In particular, in the case that an abrupt braking force is applied before full-braking when entering a corner, the left and right front forks 11 and 12 do not make strokes, but a relatively large strain is generated in the inner tube 14′ in such a manner that the brake bracket portion 17′c of the right front fork 13′ is instantaneously pulled by the disc plate 73 (shown by an arrow A in FIG. 3), as shown in FIG. 3.

Under the strain mentioned above, when the brake caliper 25 attached to the brake bracket portion 17′c of the right front fork 12 is pulled in a rotating direction of the disc plate 73 (an arrow A) during braking, a rotation moment (an arrow B) around an attaching portion 17′d of the brake bracket portion 17′c to the axle bracket 17′ is generated as a reaction force thereof in the axle portion 17′a of the axle bracket 17′. The result is that a relatively large strain is generated in the inner tube 14′ on the side to which the brake caliper 25 is attached. Further, the longer the arms 21a and 21b of the brake bracket portion 17′c are, and the more eccentric to the upper side from the axial portion 17′a inserting the axle 23 thereto the position of the attaching portion 17′d of the brake bracket portion 17′c is, the larger the rotation moment (the arrow B) of the axle portion 17′a is.

Accordingly, the stress value may be reduced by making a diameter of the inner tube 14′ large. However, the difference between the left and right still remains.

On the basis of the consideration mentioned above, it is known that an extensive improvement can be expected only by increasing rigidity of the right front fork 12 to which the brake apparatus is attached.

Accordingly, rigidity of the right front fork 12 is increased so as to reduce the yaw feeling by making the thickness of the inner tube 14′ of the right front fork 12 to which the brake caliper 25 is attached larger than the thickness of the left inner tube 11 to which the brake caliper 25 is not attached. In particular, the increase of the thickness of the inner tube 14′ of the right front fork 12 is achieved by forming the inner diameter of the inner tube 14′ of the right front fork 12 while keeping the same outer diameter of the left and right front fork 11 and 12.

In accordance with the present embodiment, the following operations and effects can be obtained.

(a) Since the brake caliper 25 is pulled in the rotating direction (shown by the arrow A in FIG. 3) of the disc plate 73 during braking, the bending moment (shown by the arrow B in FIG. 3) deflecting the axle portion 17′a of the axle bracket 17′ to the rear side in the forward moving direction is applied around the attaching portion 17′d of the brake bracket portion 17′c of the axle bracket 17′ to which the brake caliper 25 is attached.

However, in one embodiment, since the thickness of the inner tube 14′ of the front fork 12 on one side, for example the right side to which the brake caliper is attached, is made larger than the thickness of the inner tube 14 of the front fork 11 in the other side, for example the left side to which the brake caliper 25 is not attached, the deflection of the one side, for example the right side to the rear side of the axle portion 17′a of the front fork 12 during braking becomes small, thereby inhibiting the front wheel 27 from being shifted to the front fork 12 side in the one side, for example the right side provided with the brake apparatus.

(b) In the case of the inverted type front fork, since the diameter of the inner tube 14′ in the tire wheel side is smaller than that of the outer tube 13′ in the vehicle body side, and the length of the portion receiving the bending stress is long, the bending stress of the inner tube 14′ is larger than the outer tube 13′. Accordingly, it is possible to increase the effect of reducing the yaw feeling of the front wheel 27 by making the thickness of the inner tube 14′ of the inverted type front fork large.

In this case, the present embodiment relates to the inverted type front fork in which the outer tube is attached to the vehicle body side, and the inner tube is attached to the tire wheel side. However, the invention may be employed in a regular type front fork in which the outer tube is attached to the axle side, and the inner tube is attached to the vehicle body side.

Further, in accordance with the present embodiment, the brake apparatus is constituted by the brake caliper apparatus pinching the disc plate therebetween. However, the structure may be made such that the brake apparatus has a brake shoe apparatus brought into slidable contact with an inner periphery of a brake drum provided in the front wheel. A stopper portion receiving a brake reaction force is provided only in the tire wheel side tube of the front fork on one side of the left or right sides, and the stopper portion is provided at a position which is eccentric to the above from the axle portion of the front fork.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A front fork apparatus of a two-wheeled vehicle or the like comprising:
   a front fork having a vehicle body side tube and a tire wheel side tube which are slidably fitted to each other, the front fork being provided on both right and left sides of a front wheel; and
   a brake apparatus attached only to the front fork on one side of the right and left sides,
   wherein a thickness of the tire wheel side tube of the front fork in the one side to which the brake apparatus is attached, is made larger than a thickness of the tire wheel side tube of the front fork in the other side.

2. A front fork apparatus of a two-wheeled vehicle or the like as claimed in claim 1, wherein the brake apparatus is constituted by a brake caliper provided astride a disc plate arranged on one side of the right and left sides of the front wheel, a brake bracket portion provided with an arm extending to a rear side in a longitudinal direction of the vehicle being integrally formed at a position which is eccentric to an upper side from an axle portion in a lower end of the tire wheel side tube of the front fork in the one side of the right and left sides, the brake caliper being attached to a leading end portion of the arm of the brake bracket portion.

3. A front fork apparatus of a two-wheeled vehicle or the like as claimed in claim 1, wherein the front fork apparatus is an inverted type front fork in which the tire wheel side tube of the right and left front forks corresponds to an inner tube, and the vehicle body side tube corresponds to an outer tube.

4. A front fork apparatus of a two-wheeled vehicle or the like as claimed in claim 2, wherein the front fork apparatus is constituted by an inverted type front fork in which the tire wheel side tube of the right and left front forks corresponds to an inner tube, and the vehicle body side tube corresponds to an outer tube.

5. A front fork apparatus of a two-wheeled vehicle or the like as claimed in claim 1, wherein an inner diameter of the tire wheel side tube of the front fork on the one side to which the brake apparatus is attached is made smaller than an inner diameter of the tire wheel side tube of the front fork on the other side, while keeping the same outer diameter of the both front forks.

6. A front fork apparatus of a two-wheeled vehicle or the like as claimed in claim 1, wherein the brake apparatus is a brake shoe apparatus brought into slidable contact with an inner periphery of a brake drum provided in the front wheel, a stopper portion receiving a brake reaction force provided only in the tire wheel side tube of the front fork in one side of the left and right sides, the stopper portion being provided at a position which is eccentric to the above from the axle portion of the front fork.

* * * * *